(12) United States Patent
Kishi et al.

(10) Patent No.: US 10,533,656 B2
(45) Date of Patent: Jan. 14, 2020

(54) AUTOMATIC TRANSMISSION AND CONTROL METHOD THEREFOR

(71) Applicant: Nissan Motor Co., Ltd., Yokohama-shi, Kanagawa (JP)

(72) Inventors: Daigo Kishi, Kanagawa (JP); Toshiaki Motomura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 42 days.

(21) Appl. No.: 15/770,800

(22) PCT Filed: Nov. 19, 2015

(86) PCT No.: PCT/JP2015/082507
§ 371 (c)(1),
(2) Date: Apr. 25, 2018

(87) PCT Pub. No.: WO2017/085828
PCT Pub. Date: May 26, 2017

(65) Prior Publication Data
US 2018/0306312 A1  Oct. 25, 2018

(51) Int. Cl.
*F16H 59/20* (2006.01)
*F16H 61/662* (2006.01)
*F16H 59/44* (2006.01)
*F16H 59/48* (2006.01)
*F16H 61/02* (2006.01)
(Continued)

(52) U.S. Cl.
CPC ............. *F16H 59/20* (2013.01); *F16H 59/44* (2013.01); *F16H 59/48* (2013.01); *F16H 61/029* (2013.01); *F16H 61/0248* (2013.01); *F16H 61/662* (2013.01); *F16H 59/18* (2013.01); *F16H 61/0213* (2013.01); *F16H 2061/0244* (2013.01); *F16H 2061/6615* (2013.01)

(58) Field of Classification Search
CPC .......... F16H 59/20; F16H 59/44; F16H 59/48; F16H 61/0248; F16H 61/662; F16H 2061/6615
See application file for complete search history.

(56) References Cited

U.S. PATENT DOCUMENTS

| | | | |
|---|---|---|---|
| 2007/0015625 A1 | 1/2007 | Wohlrab et al. | |
| 2008/0147284 A1* | 6/2008 | Tuckfield | B60L 58/12 701/56 |
| 2013/0244833 A1 | 9/2013 | Takamura et al. | |

(Continued)

FOREIGN PATENT DOCUMENTS

| | | |
|---|---|---|
| CN | 101498369 A | 8/2009 |
| CN | 104776211 A | 7/2015 |

(Continued)

*Primary Examiner* — Stacey A Fluhart
(74) *Attorney, Agent, or Firm* — Global IP Counselors, LLP

(57) ABSTRACT

In a vehicle having a continuously variable transmission, a controller selectively performs a first control mode in which a transmission ratio is controlled in a stepless manner, and a second control mode in which the transmission ratio is controlled in a stepwise manner to perform an upshift after a vehicle speed has increased. When the second control mode is selected in response to a driver's acceleration request, the controller continuously downshifts the transmission ratio until the upshift is performed.

8 Claims, 9 Drawing Sheets

(51) Int. Cl.
*F16H 59/18* (2006.01)
*F16H 61/66* (2006.01)

(56) References Cited

U.S. PATENT DOCUMENTS

| | | | | |
|---|---|---|---|---|
| 2016/0312889 A1* | 10/2016 | Kato | ........................ | F16H 61/66 |
| 2017/0138471 A1* | 5/2017 | Vu | ........................... | F16H 9/18 |
| 2017/0349180 A1* | 12/2017 | Honma | ................... | F16H 61/14 |
| 2018/0194225 A1* | 7/2018 | Tanizoe | ............... | B60W 50/14 |
| 2018/0297465 A1* | 10/2018 | Miyaishi | ................ | B60K 35/00 |
| 2018/0306312 A1* | 10/2018 | Kishi | .................... | F16H 59/20 |

FOREIGN PATENT DOCUMENTS

| | | | |
|---|---|---|---|
| JP | 62-163835 | A | 7/1987 |
| JP | 2002-329140 | A | 11/2002 |
| JP | 5120102 | B2 | 11/2012 |
| JP | 2013-194810 | A | 9/2013 |
| JP | 2014-149051 | A | 8/2014 |

* cited by examiner

AUTOMATIC TRANSMISSION AND CONTROL METHOD THEREFOR

CROSS-REFERENCE TO RELATED APPLICATIONS

This application is a U.S. National stage application of International Application No. PCT/JP2015/082507, filed on Nov. 19, 2015.

BACKGROUND

Field of the Invention

The present invention relates to a continuously variable automatic transmission, and a control method therefor.

Background Information

Japanese Patent No. 5120102 (Patent Document 1) discloses a technique in which, in a vehicle comprising a continuously variable transmission, when the driver depresses the accelerator pedal with an acceleration intent from a constant travel speed, an acceleration virtual gear shift line for selecting a transmission ratio with which the engine rotational speed can easily increase is generated, and, after the engine rotational speed reaches a rotational speed threshold that is set for each accelerator position opening amount and vehicle speed, the transmission ratio is changed in a stepwise manner as in a stepped automatic transmission to thereby improve the feeling of acceleration.

SUMMARY

However, if the target engine rotational speed corresponding to the accelerator position opening amount is low when the driver depresses the accelerator pedal with an acceleration intent, then the driving force at the start of acceleration will be low and also the increase of the engine rotational speed will be slow; therefore, there is the problem that the acceleration intended by the driver cannot be obtained.

In view of the problems described above, an object of the present invention is to provide a control device for an automatic transmission that is capable of accelerating in accordance with the driver's intent.

In order to achieve the above-described object, in the present invention, when the transmission ratio of a continuously variable transmission, which shifts and outputs engine rotational speed in a stepless manner, is controlled so that the engine rotational speed increases in conjunction with an increase in vehicle speed and an upshift is performed after the vehicle has accelerated, downshifting is performed continuously until the upshift occurs.

Therefore, even when the engine torque or the engine output horsepower at the engine rotational speed when the accelerator pedal is depressed are low and it is difficult to accelerate, the engine rotational speed can be effectively increased by continuously downshifting, and it becomes possible to accelerate by ensuring the engine torque and the engine output horsepower.

DETAILED DESCRIPTION OF EMBODIMENTS

Embodiments of the present invention will be explained below with reference to the appended drawings.

First Embodiment

Figure 1:
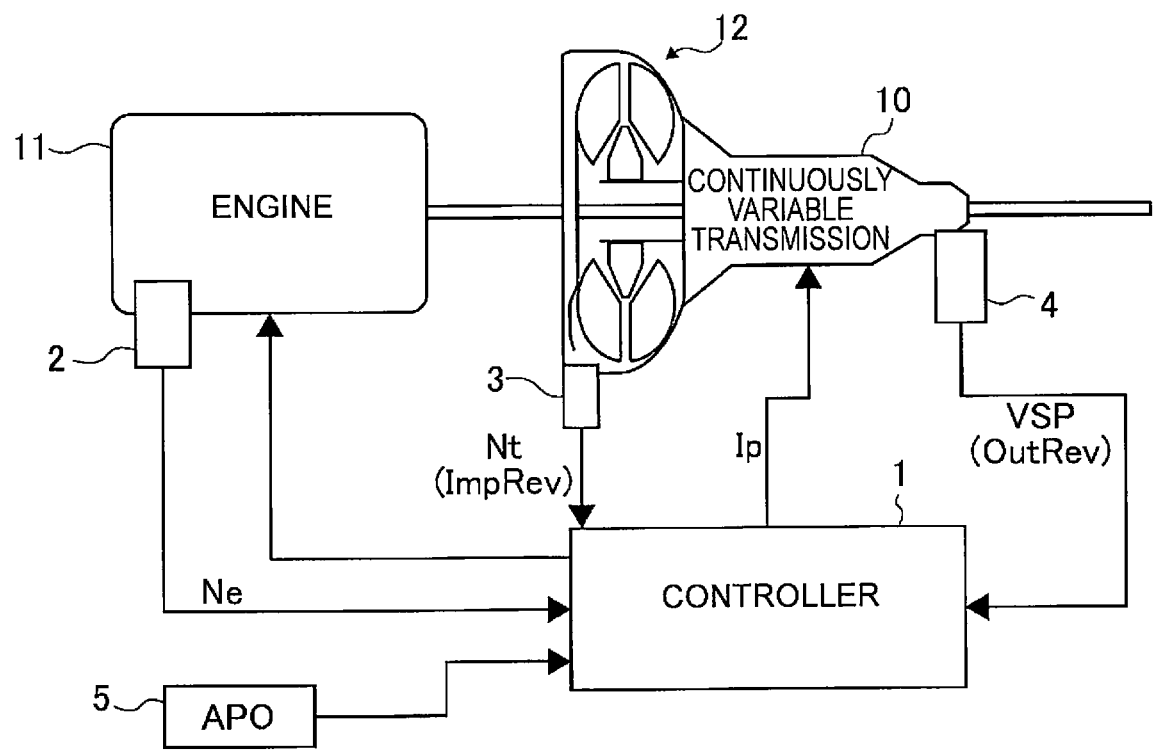
FIG. 1 is a block view illustrating a configuration of an automatic transmission in a first embodiment.

FIG. 1 is a block view illustrating a configuration of an automatic transmission in a first embodiment. A continuously variable transmission 10 comprising a torque converter 12 is connected to the engine 11. The engine 11 and the continuously variable transmission 10 are provided with a controller 1 that controls the transmission ratio of the continuously variable transmission 10 and the output of the engine 11, such that the optimum driving state is achieved according to the traveling state. A V-belt type or a toroidal type may be employed as the continuously variable transmission mechanism of the continuously variable transmission 10.

The controller 1 performs a fuel injection amount control, an ignition timing control, and the like, of the engine 11 in accordance with the driving state. In addition, the controller controls the transmission ratio of the continuously variable transmission 10 in a stepless manner, in accordance with the driving state. The rotational speed of the engine 11 is thereby controlled. That is, this controller 1 is configured as a control means for controlling the continuously variable transmission 10 based on the rotational speed of the engine. An accelerator pedal opening amount sensor 5 that detects the accelerator pedal opening amount (hereinafter referred to as the accelerator pedal opening amount APO) based on an accelerator pedal operation, a vehicle speed sensor 4 that detects the travel speed of the vehicle (hereinafter referred to as the vehicle speed VSP) by detecting the output rotational speed OutRev of the continuously variable transmission 10 and multiplying this value by a constant (tire radius, etc.) corresponding to the vehicle specification or the final reduction ratio thereto, an engine rotational speed sensor 2 that detects the engine rotational speed of the engine 11 (hereinafter referred to as the engine rotational speed Ne), an input shaft rotational speed sensor 3 that detects the input shaft rotational speed of the continuously variable transmission 10 (hereinafter referred to as the input shaft rotational speed Nt.), and the like are connected to the controller 1. The controller 1 detects the driving state of the vehicle from each of the values obtained from these sensors. Since input shaft rotational speed Nt and the engine rotational speed Ne can be considered to be the same when the torque converter 12 is in a lock-up state, the description below will be given using the engine rotational speed Ne.

Figure 2:
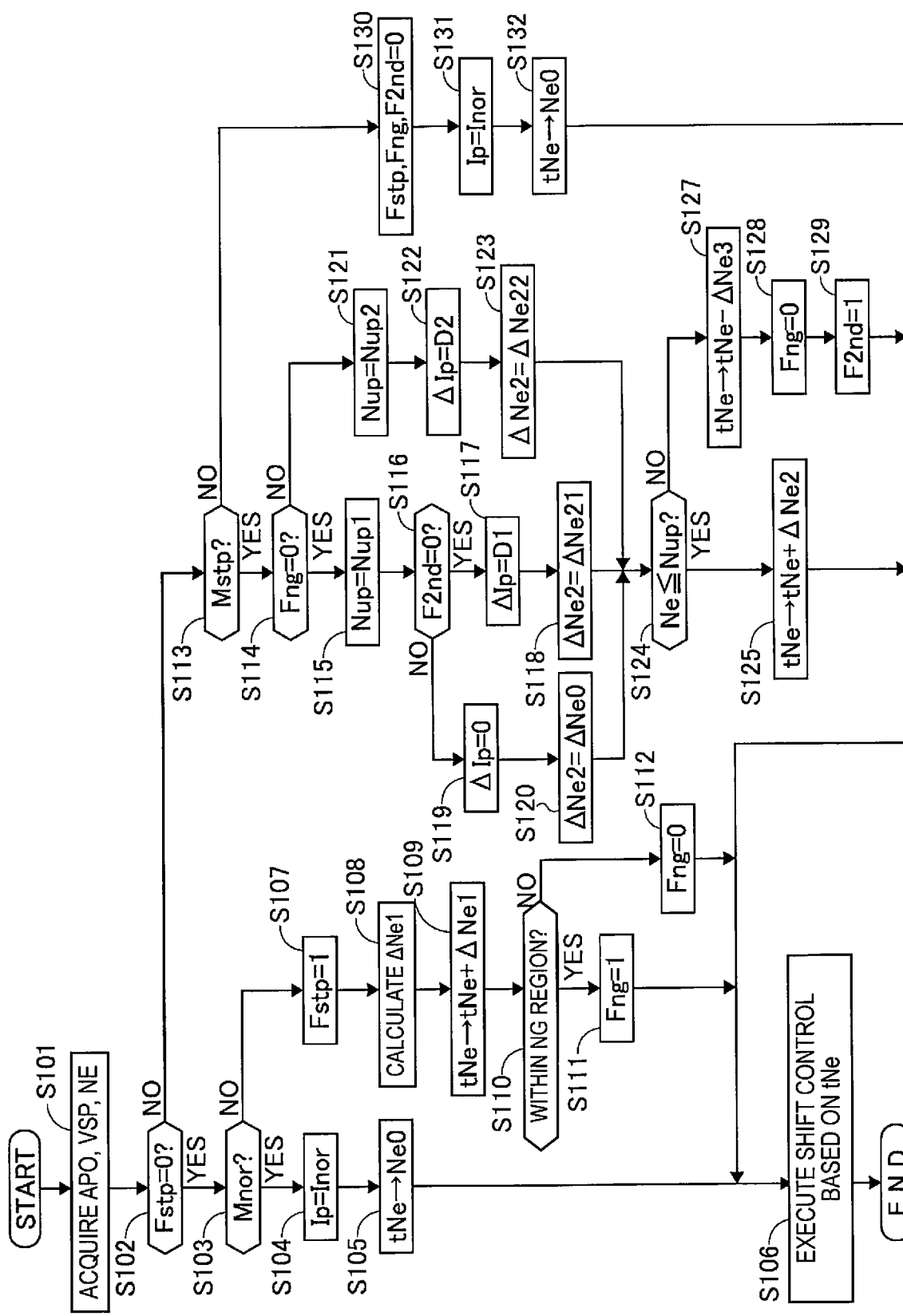
FIG. 2 is a flowchart of a shift control process of the first embodiment.

FIG. 2 is a flowchart of a shift control process of the first embodiment. The process of the flowchart illustrated in FIG. 2 is executed by the controller 1 at a predetermined cycle (for example, every several tens of milliseconds). In the control process according to this flowchart, the continuously variable transmission 10 is controlled while switching between a control mode in which the transmission ratio is variably controlled in a stepless manner in accordance with the driving state (hereinafter referred to as "normal shifting mode"), and a control mode in which upshifting is performed after accelerating by increasing the engine rotational speed in conjunction with an increase in the vehicle speed, as if it were a stepped transmission, although it is a continuously variable transmission (hereinafter referred to as "pseudo-stepped upshift mode"). In addition to the processing of this flowchart, the controller 1 detects the accelerator pedal opening amount APO, the vehicle speed VSP, the engine rotational speed Ne, and the like, in the background, based on the detection values from the respective sensors.

In Step S101, the current accelerator pedal opening amount APO, the vehicle speed VSP and the engine rotational speed Ne are acquired.

In Step S102, it is determined whether or not the current control mode is the normal shifting mode (hereinafter referred to as the normal shifting mode Mnor) or the pseudo-stepped upshift mode (hereinafter referred to as the pseudo-stepped upshift mode Mstp) based on a pseudo-stepped upshift mode flag (hereinafter referred to as the pseudo-stepped upshift mode flag Fstp). If the pseudo-stepped upshift mode flag Fstp is set (the value of the pseudo-stepped upshift mode flag Fstp is 1), it is determined that the control mode is the pseudo-stepped upshift mode Mstp, and the process proceeds to Step S113. If the pseudo-stepped upshift mode flag Fstp is not set (the value of the pseudo-stepped upshift mode flag Fstp is 0), it is determined that the control mode is not the pseudo-stepped upshift mode Mstp, and the process proceeds to Step S103. The initial value of the pseudo-stepped upshift mode flag Fstp is 0, and, if it is determined in the subsequent Step S103 that the control mode is the pseudo-stepped upshift mode Mstp, it is set in the process of Step S107.

In Step S103, it is determined whether or not the current control mode is the normal shifting mode Mnor or the pseudo-stepped upshift mode Mstp, based on the respective values acquired in Step S101. If it is determined to be the normal shifting mode Mnor, the process proceeds to Step S104. If it is determined to be the pseudo-stepped upshift mode Mstp, the process proceeds to Step S107. Specifically, if the accelerator pedal opening amount APO is greater than or equal to an accelerator pedal opening amount threshold (hereinafter referred to as the accelerator pedal opening amount threshold APO1), and the accelerator pedal opening speed (hereinafter referred to as the accelerator pedal opening speed dAPO.), which is the differential value of the accelerator pedal opening amount APO, is greater than or equal to the accelerator pedal opening speed threshold (hereinafter referred to as the accelerator pedal opening speed threshold dAPO1.), the controller 1 determines that there is an acceleration request by the driver, and determines the pseudo-stepped upshift mode Mstp. The accelerator pedal opening amount threshold APO1 and the accelerator pedal opening speed threshold dAPO1 are threshold values for determining the presence of an acceleration request by the driver. If the accelerator pedal opening amount APO can be detected in eight stages, the accelerator pedal opening amount threshold APO1 may be set to an opening amount of about 2 or 3 of the eight stages (2/8 or 3/8). In addition, the accelerator pedal opening speed threshold dAPO1 may be set to, for example, 60 deg/s in the depression direction, but neither threshold value is limited to the respective exemplified value.

If the accelerator pedal opening amount APO and the accelerator pedal opening speed dAPO are both less than these threshold values (the accelerator pedal opening amount threshold APO1 and the accelerator pedal opening speed threshold dAPO1), for example, it is determined that the driver is requesting a travel regime that matches the road load (the traveling load resistance, including the road surface resistance and the drive resistance), and the normal shifting mode Mnor is determined. If the normal shifting mode Mnor is determined, the process proceeds to Step S104, and the target transmission ratio of the continuously variable transmission 10 (hereinafter referred to as the target transmission ratio Ip.) is set to a normal target transmission ratio (hereinafter referred to as the normal target transmission ratio Inor.). The normal target transmission ratio Inor is determined by conventionally well-known methods based on the accelerator pedal opening amount APO, the vehicle speed VSP, and the engine rotational speed Ne. As a specific example, the normal target transmission ratio Inor is determined by the controller 1 setting an engine rotational speed during normal control (hereinafter referred to as the engine rotational speed during normal control Ne0.), which is the corresponding target input shaft rotational speed, from the vehicle speed VSP and the accelerator pedal opening amount APO based on a map, in the same manner as the method disclosed in Japanese Patent Application No. 2002-329140.

In Step S105, the set engine rotational speed during normal control Ne0 is set as the new target engine rotational speed (hereinafter referred to as the target engine rotational speed tNe.).

In Step S106, the continuously variable transmission 10 is shift-controlled such that the engine rotational speed Ne matches the target engine rotational speed tNe. After this Step S106 is completed, the processing of the present flowchart is temporarily ended.

In the process of the above-described Step S103, if the accelerator pedal opening amount APO and the accelerator pedal opening speed dAPO are both greater than or equal to these threshold values (the accelerator pedal opening amount threshold APO1 and the accelerator pedal opening speed threshold dAPO1), it is determined that there is an acceleration request by the driver, and the pseudo-stepped upshift mode Mstp is determined. If the current control mode is determined to be the pseudo-stepped upshift mode Mstp, the process proceeds to Step S107, and the controller 1 first sets the pseudo-stepped upshift mode flag Fstp to 1.

In Step S108, the downshift amount of the transmission ratio is set to satisfy the driver's acceleration request. Specifically, the driver's acceleration intent is obtained from a map, from the accelerator pedal opening amount APO and the accelerator pedal opening speed dAPO. Then, a gear shift characteristic of a downshift corresponding to this acceleration intent is selected. Then, from the selected gear shift characteristic, a transmission ratio equivalent change amount (hereinafter referred to as the transmission ratio equivalent change amount ΔNe1.), which is the amount of change in the engine rotational speed Ne that corresponds to the amount of change in the transmission ratio for the downshift, is calculated in accordance with the vehicle speed VSP.

In Step S109, a new target engine rotational speed tNe is calculated by adding the transmission ratio equivalent change amount ΔNe1 to the current target engine rotational speed tNe.

Figure 9:
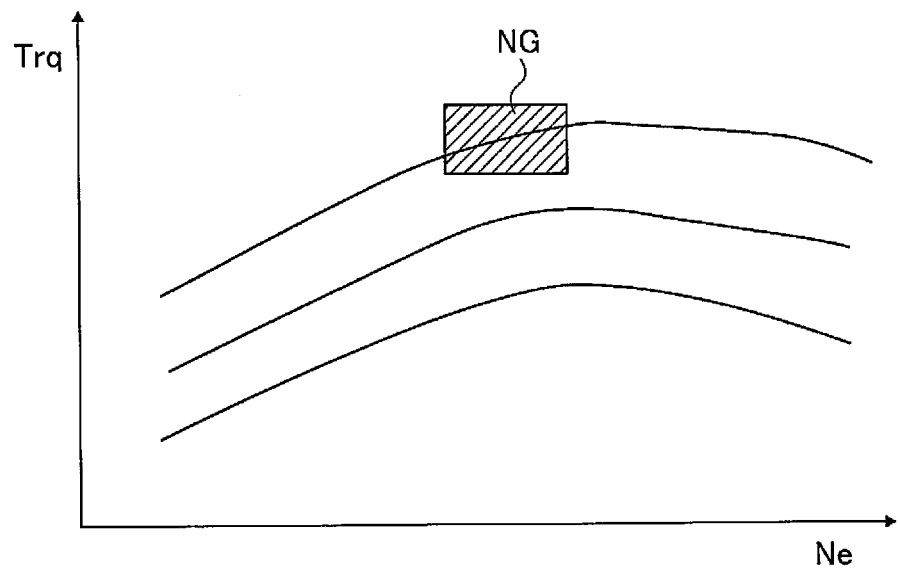
FIG. 9 shows the engine characteristic NG region map of the first embodiment.
Figure 10:
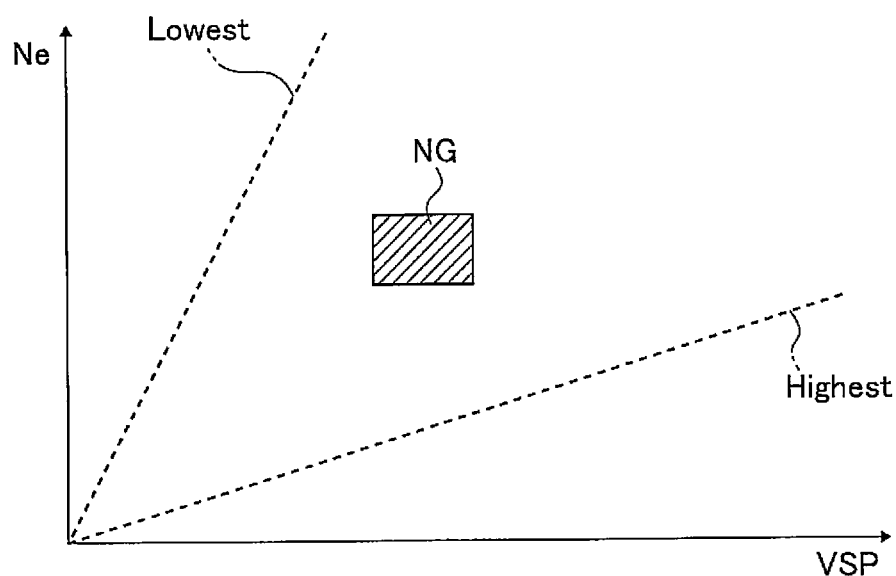
FIG. 10 shows the transmission ratio characteristic NG region map of the first embodiment.

In Step S110, it is determined whether or not an operating point defined by a plurality of parameters including the new target engine rotational speed tNe is within a region in which a shift defect could occur (hereinafter referred to as the NG region), and, if within the NG region, the process proceeds to Step S111 and an in-NG region flag (hereinafter referred to as the in-NG region flag Fng.) is set to 1. On the other hand, if outside of the NG region, the process proceeds to Step S112, and the in-NG region flag Fng is set to 0. Here, the NG region will be described. FIG. 9 is an engine characteristic NG region map of the first embodiment, and FIG. 10 is a transmission ratio characteristic NG region map of the first embodiment. If an operating point defined by the engine rotational speed Ne and the engine torque (hereinafter referred to as the engine torque Trq) is within the region indicated by the hatched region in FIG. 9, there are regions in which the shift speed cannot be secured, or, in which the engine rotational speed Ne cannot be increased and a sufficient acceleration cannot be obtained, even if a downshift is performed. In addition, if an operating point defined by the engine rotational speed Ne (or Nt) and the vehicle speed VSP (or OutRev) is within the region indicated by the hatched region in FIG. 10, there are regions in which the shift speed of the continuously variable transmission 10 cannot be sufficiently secured. These NG regions are regions that are affected by vehicle specifications and are identified experimentally, etc. It is determined whether or not the operating point is within an NG region in these plurality of characteristics, and if it is determined that the operating point is within an NG region in any one of the characteristics, the in-NG region flag Fng is set to 1. Moreover, without being limited to the parameters described above, the characteristics may be defined using a plurality of parameters, such as the input shaft rotational speed Nt, the target transmission ratio Ip, the target transmission ratio change amount ΔIp, the output rotational speed OutRev, the target engine rotational speed change amount ΔtNe, the change amount of the engine torque Trq, the actual hydraulic pressure of the continuously variable transmission 10, and the like, to determine whether or not the operating point is within an NG region.

Then, a shift control is performed in Step S106 based on this newly calculated target engine rotational speed tNe. After this Step S106 is completed, the processing of the present flowchart is temporarily ended.

The acceleration control by the first downshift performed after transitioning to the pseudo-stepped upshift mode Mstp by the processing of Steps S108, S109, and S106, is called "initial acceleration." With this initial acceleration, first, a downshift control is performed so as to correspond to the driver's acceleration request. An acceleration control to continuously change the transmission ratio to the downshift side is performed in Steps S113 and S114 until the engine rotational speed Ne becomes an upshift determination rotational speed in Step S112, described below, to accelerate the vehicle. The acceleration control to continuously change the transmission ratio to the downshift side after the initial acceleration described above until the first upshift occurs is called "Low shift." In addition, a shift control to suppress the change amount of the transmission ratio at the time of the pseudo-stepped upshift mode Mstp after the first upshift is ended is called "linear shift."

If it is determined that the pseudo-stepped upshift mode flag Fstp is set to 1 in the processing of the above-described Step S102, it is determined whether or not the pseudo-stepped upshift mode Mstp continues in Step S113. In the present flowchart, if a transition to the pseudo-stepped upshift mode Mstp is first determined in Step S103, the pseudo-stepped upshift mode flag Fstp is set to 1 in Step S107. Then, in the subsequent processes, it is determined that the pseudo-stepped upshift mode flag Fstp is set to 1 in Step S102, and the process proceeds to Step S113. The process of shifting from this Step S102 to Step S113 is continued until the end of the continuation of the pseudo-stepped upshift mode Mstp is determined, and the pseudo-stepped upshift mode flag Fstp is reset to 0.

More specifically, in the processing of Step S113, if the accelerator pedal opening amount APO is less than a second accelerator pedal opening amount threshold (hereinafter referred to as the accelerator pedal opening amount threshold APO2), or the accelerator pedal opening speed dAPO is less than a second accelerator pedal opening speed threshold (hereinafter referred to as the accelerator pedal opening speed threshold dAPO2.), it is determined that the acceleration request by the driver has ended and a pseudo-stepped upshift mode Mstp is determined to have ended. If it is not the end of the pseudo-stepped upshift mode Mstp, it is determined that the pseudo-stepped upshift mode Mstp continues. The accelerator pedal opening amount threshold APO2 and the accelerator pedal opening speed threshold dAPO2 are threshold values for determining that the acceleration request by the driver has ended. Here, the accelerator pedal opening amount threshold APO2 may be set to the same value as the accelerator pedal opening amount threshold APO1 of the above-described Step S103, that is, an opening amount of about 2 or 3 of the eight stages (2/8 or 3/8). In addition, the accelerator pedal opening speed threshold dAPO2 may be set to, for example, 60 deg/s in the depression direction (or 60 deg/s in the step return direction), but neither threshold value is limited to the exemplified value. When the accelerator pedal opening amount APO or the accelerator pedal opening speed dAPO becomes less that these threshold values (accelerator pedal opening amount threshold APO2, accelerator pedal opening speed threshold dAPO2), it is determined that the pseudo-stepped upshift mode Mstp has ended, and the process proceeds to Step S130. If it is determined that the pseudo-stepped upshift mode Mstp has not ended (the pseudo-stepped upshift mode Mstp continues), the process proceeds to Step S114.

Figure 5:
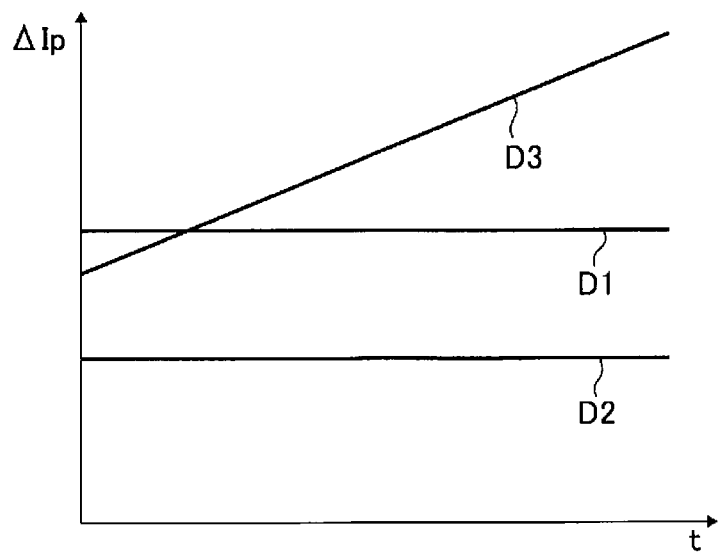
FIG. 5 is a transmission ratio change amount map of the first embodiment.

In Step S114, it is determined whether or not the in-NG region flag Fng is 0; if 0, it is determined to be outside of an NG region and the process proceeds to Step S115, and if 1, it is determined to be within an NG region and the process proceeds to Step S121. FIG. 5 is a transmission ratio change amount map of the first embodiment. The horizontal axis is a time axis, which shifts to the right side of FIG. 5 as the control cycles are repeated. In the first embodiment, an example is shown in which a fixed value is employed as the transmission ratio change amount.

When outside of an NG region, a Low shift is performed, with the change amount of the target transmission ratio Ip (hereinafter referred to as the target transmission ratio change amount ΔIp) per one control cycle after the initial acceleration set to a first transmission ratio change amount (hereinafter referred to as the first transmission ratio change amount D1.) (hereinafter referred to as the normal Low shift.). On the other hand, when within an NG region, a Low shift, in which the downshift amount is suppressed more than the normal Low shift, is performed (hereinafter referred to as the suppressed Low shift.) with the target transmission ratio change amount ΔIp after the initial acceleration set to a second transmission ratio change amount (hereinafter referred to as the second transmission ratio change amount D2 (<first transmission ratio change amount D1)).

Normal Low Shift

Figure 3:
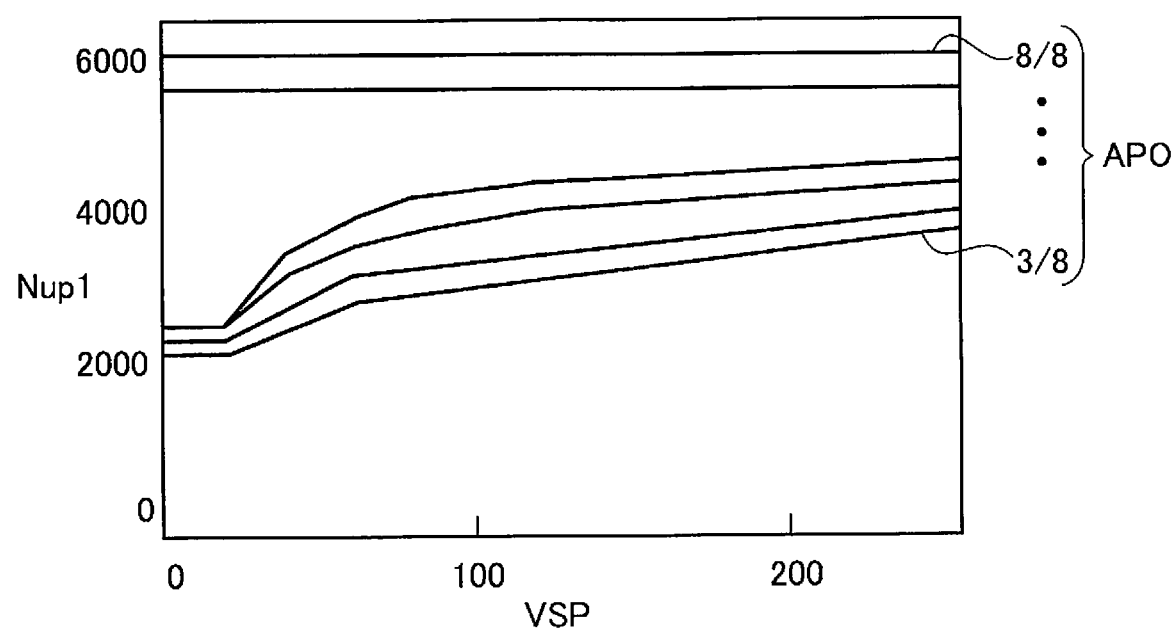
FIG. 3 is an upshift determination rotational speed map of the first embodiment.

In Step S115, first, a first upshift determination rotational speed (hereinafter referred to as the first upshift determination rotational speed Nup1.) is set as the upshift determination rotational speed (hereinafter referred to as the upshift determination rotational speed Nup.). The first upshift determination rotational speed Nup1 is a value for determining at which timing to perform an upshift during an execution of a normal Low shift after a shift control (corresponding to an initial acceleration) has been performed based on the downshift set in the above-described Step S108. FIG. 3 is an upshift determination rotational speed map of the first embodiment. The upshift determination rotational speed map illustrated in FIG. 3 is a map in which the correspondence relationship between the vehicle speed VSP and the first upshift determination rotational speed Nup1 is set for each accelerator pedal opening amount APO. The accelerator pedal opening amount APO is set so as to be detected in eight stages, as described above. In the example shown in FIG. 3, the correspondence relationship between the vehicle speed VSP and the engine rotational speed Ne is shown for each of six stages of the accelerator pedal opening amount APO, from 3/8 to 8/8, which is the determination condition for the pseudo-stepped upshift mode Mstp. According to this upshift determination rotational speed map, a lower first upshift determination rotational speed Nup1 is selected and the upshift control is performed at a lower engine rotational speed Ne as the accelerator pedal opening amount APO is decreased, that is, as the driver's acceleration request is decreased.

The controller 1 acquires the first upshift determination rotational speed Nup1 from the current vehicle speed VSP and the accelerator pedal opening amount APO acquired in Step S101 with reference to the upshift determination rotational speed map illustrated in FIG. 3. This upshift determination rotational speed map is set such that the first upshift determination rotational speed Nup1 becomes lower as the driver's acceleration request becomes smaller, as described below.

In Step S116, it is determined whether or not an initial determination flag, which indicates that the first upshift has occurred and that a control is being performed for the second upshift (hereinafter referred to as the initial determination flag F2nd.) is set to 0; if set to 0, it is determined that it is before the occurrence of the first upshift, and the process proceeds to Step S117; and if set to 1, it is determined that the first upshift has occurred, and the process proceeds to Step S119.

In Step S117, the target transmission ratio change amount ΔIp in Low shift is set to the first transmission ratio change amount D1. The first transmission ratio change amount D1 is a value with which the engine rotational speed Ne at the time of the start of acceleration can be raised to an engine rotational speed Ne at which the engine torque and the engine output horsepower are high within a predetermined time. That is, when traveling in a state where the vehicle load is high, for example, when traveling at a high vehicle speed or on an uphill road, the rise in the engine rotational speed Ne becomes slow, so that it becomes difficult to impart to the driver the expected sense of acceleration. In addition, even if the driver depresses the accelerator pedal with an acceleration intent, if the target engine rotational speed tNe corresponding to the accelerator pedal opening amount APO is low, the driving force at the start of acceleration becomes low and the rise of the engine rotational speed Ne is also slow; therefore, there it becomes difficult to impart to the driver the expected sense of acceleration. Therefore, even when the engine torque and the engine output horsepower at the engine rotational speed Ne at the start of acceleration are low and it is difficult to accelerate, the engine rotational speed Ne can be effectively increased and it becomes possible to accelerate by ensuring the engine torque and the engine output horsepower by setting the target transmission ratio change amount ΔIp.

In Step S118, a first engine rotational speed change amount, which is the change amount of the engine rotational speed Ne corresponding to target transmission ratio change amount ΔIp=first transmission ratio change amount D1 (hereinafter referred to as the first engine rotational speed change amount ΔNe21.) is calculated, and engine rotational speed increase amount ΔNe2=first engine rotational speed change amount ΔNe21 is set. The engine rotational speed increase amount ΔNe2 represents the amount of increase of the engine rotational speed Ne per one control cycle at the time of the pseudo-stepped upshift mode Mstp.

Linear Shift

In Step S119, since control is being performed for the second upshift, Low shift is switched to linear shift. Specifically, the acceleration intent of the driver is obtained from a map, from the accelerator pedal opening amount APO and the accelerator pedal opening speed dAPO. Next, a gear shift characteristic of an upshift corresponding to this acceleration intent is selected. Then, a linear engine rotational speed change amount which is the change amount of the engine rotational speed Ne corresponding to the change amount of the transmission ratio in the upshift (hereinafter referred to as the linear engine rotational speed change amount ΔNe0.) is calculated from the selected gear shift characteristic in accordance with the vehicle speed VSP, and the engine rotational speed increase amount ΔNe2 is set to the linear engine rotational speed change amount ΔNe0 in Step S120.

Suppressed Low Shift

In Step S121, since it has been determined to be within an NG region in Step S114, the upshift determination rotational speed Nup is set to a second upshift determination rotational speed Nup2, which is a smaller value than the first upshift determination rotational speed Nup1. The second upshift determination rotational speed Nup2 may be set by obtaining a first upshift determination rotational speed Nup1 from the upshift determination rotational speed map in FIG. 3, and by setting a value obtained by subtracting a predetermined amount therefrom as the second upshift determination rotational speed Nup2, or an upshift determination rotational speed map for the suppressed Low shift may be separately provided. The action of the second upshift determination rotational speed Nup2 will be described further below.

In Step S122, the target transmission ratio change amount ΔIp in the Low shift is set to the second transmission ratio change amount D2. The second transmission ratio change amount D2 is a smaller value than the first transmission ratio change amount D1.

In Step S123, a second engine rotational speed change amount, which is the change amount of the engine rotational speed Ne corresponding to target transmission ratio change amount ΔIp=second transmission ratio change amount D2 (hereinafter referred to as the second engine rotational speed change amount ΔNe22.) is calculated, and engine rotational speed increase amount ΔNe2=second engine rotational speed change amount ΔNe22 is set.

That is, if the operating point is within an NG region, there may be cases in which an increase in the engine rotational speed Ne cannot be effectively performed, or in which the continuously variable transmission 10 cannot be promptly changed, even if the transmission ratio is shifted to the Low side. In this case, even if the target transmission ratio change amount ΔIp is set to the first transmission ratio change amount D1, a driving force cannot be secured, and an increase in the vehicle speed VSP cannot be expected. Therefore, in the suppressed Low shift, an increase in the engine rotational speed Ne is suppressed while securing the driving force by suppressing the downshift amount more than in the normal Low shift. At this time, if the first upshift determination rotational speed Nup1 is set according to target transmission ratio change amount ΔIp=second transmission ratio change amount D2, since the increase speed of the engine rotational speed Ne is being suppressed, the timing of reaching the first upshift determination rotational speed Nup1 is delayed. Then, a delay occurs until an upshift occurs, and there is the risk of impairing the rhythmic sensation of upshifting. Therefore, by setting a second upshift determination rotational speed Nup2 that is smaller than the first upshift determination rotational speed Nup1, the timing at which the engine rotational speed Ne reaches the second upshift determination rotational speed Nup2 is essentially matched to the timing at which the engine rotational speed Ne reaches the first upshift determination rotational speed Nup1 in the normal Low shift. As a result, it become possible to upshift with the same rhythmic sense as in the normal Low shift, even when in the suppressed Low shift.

Step-by-Step Upshift

In Step S124, the engine rotational speed Ne acquired in Step S101 and the first upshift determination rotational speed Nup1 acquired in Step S115 are compared, and it is determined whether or not the engine rotational speed Ne has exceeded the first upshift determination rotational speed Nup1. If the engine rotational speed Ne is less than or equal to the first upshift determination rotational speed Nup1, the process proceeds to Step S125. If the engine rotational speed Ne has exceeded the first upshift determination rotational speed Nup1, the process proceeds to Step S127.

In Step S125, a new target engine rotational speed tNe is calculated by adding the engine rotational speed increase amount ΔNe2 to the current target engine rotational speed tNe. Then, a shift control is performed in Step S106 based on this newly calculated target engine rotational speed tNe. After this Step S106 is completed, the processing of the present flowchart is temporarily ended. In this manner, the engine rotational speed Ne increases by a control to suppress the change in the transmission ratio in the Low shift and the linear shift after determining the pseudo-stepped upshift mode Mstp.

In the above-described Step S124, if the engine rotational speed Ne has exceeded the first upshift determination rotational speed Nup1, the process proceeds to Step S127 and an upshift control is performed. Specifically, a third engine rotational speed change amount which is the change amount of the engine rotational speed Ne corresponding to the upshift amount (hereinafter referred to as the third engine rotational speed change amount ΔNe3.) is set. This third engine rotational speed change amount ΔNe3 is set such that the newly set target engine rotational speed tNe becomes a higher value than the target engine rotational speed tNe that is set at the time of the first downshift control when the pseudo-stepped upshift mode Mstp is determined. That is, the third engine rotational speed change amount ΔNe3 is set so that the new target engine rotational speed tNe, which is a value obtained by subtracting the third engine rotational speed change amount ΔNe3 from the engine rotational speed during normal control Ne0, becomes a higher value than the target engine rotational speed tNe that is set at the time of the first downshift control when the pseudo-stepped upshift mode Mstp is determined. Similarly, the third engine rotational speed change amount ΔNe3 to be set thereafter is set so that the newly calculated target engine rotational speed tNe becomes a higher value than the target engine rotational speed tNe set at the time of the upshift control in the previous Step S114.

That is, the vehicle speed VSP becomes greater after the previous upshift due to a shift control corresponding to the driver's acceleration request. Accordingly, the traveling resistance (for example, air resistance and internal resistance of the continuously variable transmission 10 and the engine) is increased in accordance with the increase in the vehicle speed VSP. Therefore, the controller 1 sets a value that is corrected with respect to the target engine rotational speed tNe at the time of the previous upshift to be a higher value corresponding to the shortage in the driving force due to the increase in the traveling resistance as the third engine rotational speed change amount ΔNe3. By performing an upshift control in this manner, the engine rotational speed Ne is temporarily decreased. It is thereby possible to impart a sense of acceleration to the driver similar to that of an upshift of a stepped transmission.

In Step S127, a new target engine rotational speed tNe to be the downshift characteristic is calculated by subtracting the set third engine rotational speed change amount ΔNe3 from the current target engine rotational speed tNe. Then, in Step S106, a shift control based on this newly calculated target engine rotational speed tNe is performed. If the first upshift is executed in Step S127, the in-NG region flag Fng is reset to 0 in Step S128, and the initial determination flag F2nd is set to 1 in Step S129. As a result, during the next control flow, a process to proceed to Step S115 is selected in Step S114, and to proceed to Steps S119, S120 is selected in Step S116, to thereby shift to the linear shift.

After the processing of Step S106, the process by the present flowchart is temporarily ended. In this manner, the reduction by the controller 1 of the engine rotational speed Ne by controlling the transmission ratio to the upshift side after increasing the engine rotational speed Ne by suppressing the change in the transmission ratio is called a "step-by-step upshift." This step-by-step upshift is repeatedly executed while an acceleration request continues (while the pseudo-stepped upshift mode Mstp continues) by the control from Steps S110 to S127.

In Step S113, if it is determined that the pseudo-stepped upshift mode Mstp has ended, the process proceeds to Step S130, and the controller 1 resets the pseudo-stepped upshift mode flag Fstp, the in-NG region flag Fng, and the initial determination flag F2nd to 0. Then, in Step S131, in the same manner as the above-described Step S104, the transmission ratio normal target transmission ratio Inor in the normal shifting mode Mnor is set as the target transmission ratio Ip, and in Step S132, the set engine rotational speed during normal control Ne0 is set as the target engine rotational speed tNe. Then, in Step S106, a shift control based on this newly calculated target engine rotational speed tNe is performed. After this Step S106 has been completed, the processing of the present flowchart is temporarily ended.

With the processing described above, shift control based on the driver's acceleration request is performed.

Action of Shift Control Outside of NG Region

Figure 4:
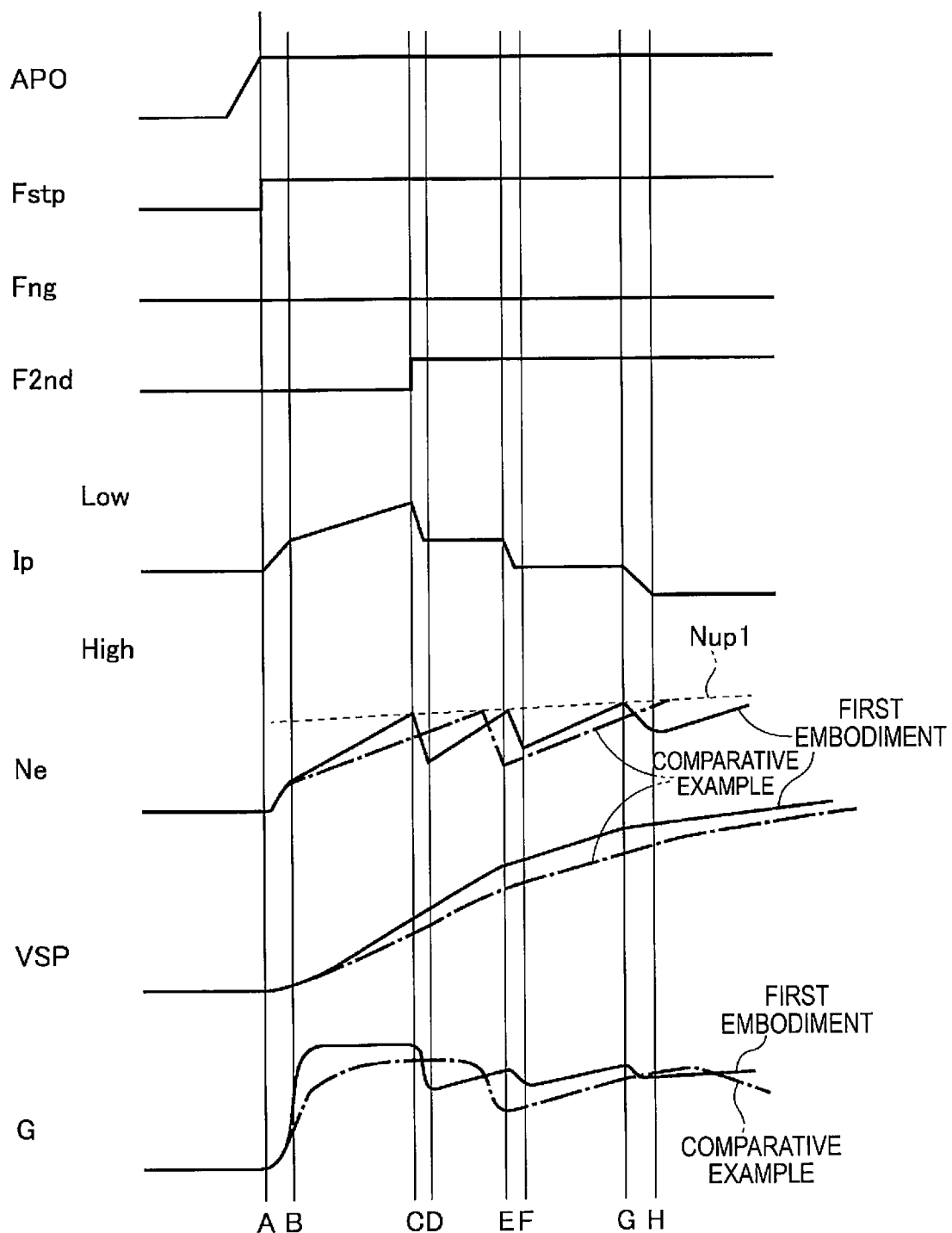
FIG. 4 is a timing chart illustrating a shift control outside of an NG region of the first embodiment.
Figure 6:
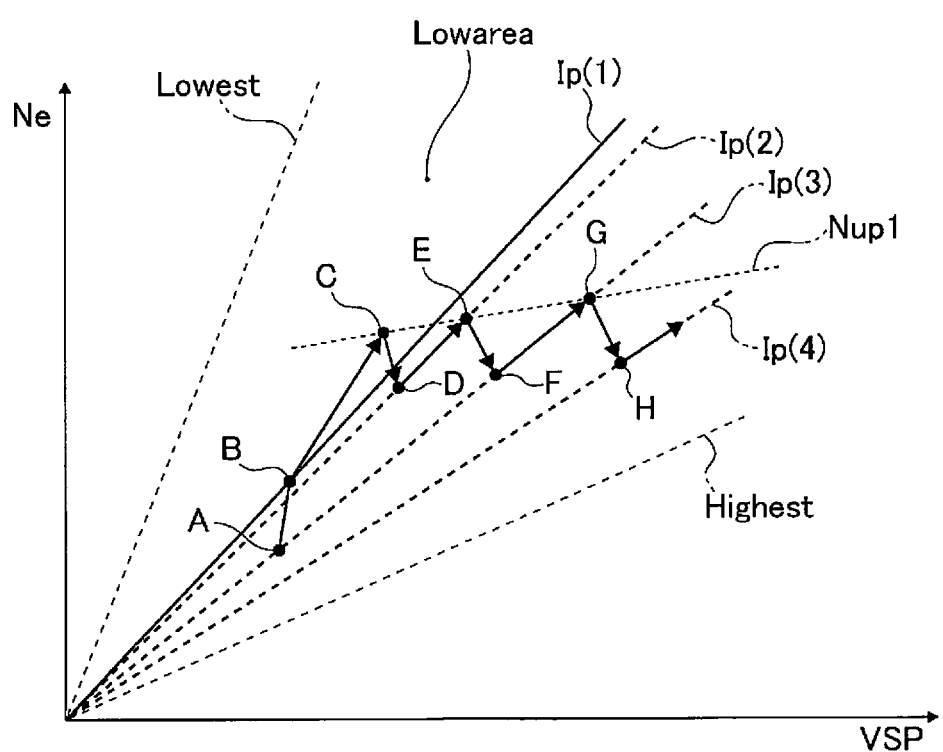
FIG. 6 is a view showing the movement of an operating point in a plane defined by the vehicle speed and the engine rotational speed according to a shift control of the first embodiment.

FIG. 4 is a timing chart illustrating a shift control outside of an NG region of the first embodiment. This timing chart illustrates, from the top of FIG. 4, the state of each of the accelerator pedal opening amount APO, the pseudo-stepped upshift mode flag Fstp, the in-NG region flag Fng, the initial determination flag F2nd, the target transmission ratio Ip, the engine rotational speed Ne, vehicle speed VSP, and vehicle acceleration (hereinafter referred to as G.), on a time axis extending from the left side to the right side. In addition, FIG. 6 is a view showing the movement of an operating point in a plane defined by the vehicle speed and the engine rotational speed according to a shift control of the first embodiment. The timings A, B, . . . G, H in FIG. 4 correspond to points A, B, G, H in FIG. 6, and the arrows that connect each of the points in FIG. 6 represent the manner in which the operating point moves over time. FIGS. 4, 6 illustrate a case in which the operating point is determined to be outside an NG region at timing A.

First, the vehicle is traveling in the normal shifting mode Mnor. That is, in this state, the accelerator pedal opening amount APO and the accelerator pedal opening speed dAPO are sufficiently small so as to not satisfy the determination criteria of the pseudo-stepped upshift mode Mstp. Here, if the driver operates the accelerator pedal opening amount APO, the determination criteria of Step S103 in the flowchart of FIG. 2 are not satisfied, and it is determined that the controller 1 has shifted to the pseudo-stepped upshift mode Mstp (timing A, point A), the pseudo-stepped upshift mode flag Fstp is set to 1 in Step S107, the target engine rotational speed tNe of an initial acceleration is set in Step S109, and the in-NG region flag Fng is set to 0 in Step S111. The vehicle speed VSP is gradually accelerated by this initial acceleration. In addition, the vehicle G, which is derived from the inclination of the vehicle speed VSP, also increases.

After this initial acceleration, a shift control at the transmission ratio set in Step S113 according to target transmission ratio change amount ΔIp=first transmission ratio change amount D1 set in Step S117 is started by the Low shift (timing B, point B). Timing B and point B are at the start of acceleration. At this time, when the transmission ratio at point B after initial acceleration is considered as the target transmission ratio Ip (1), a shift control toward a region on a lower transmission ratio side than the target transmission ratio Ip (1) is performed by Low shift, as illustrated in FIG. 6. Here, if the trajectory of the operating point is expressed in a plane defined by the vehicle speed and the engine rotational speed as in FIG. 6, the slope of a line connecting the operating point and the origin is expressed as the transmission ratio. Therefore, if downshifting is continued until an upshift occurs, the tangent line of the trajectory of the operating point in the section corresponding to point B to point C in FIG. 6 (in the case of FIG. 6, a line that matches a straight line that connects point B and point C) will not pass through the origin of FIG. 6. Therefore, as in the comparative example illustrated by the dotted line in FIG. 4, it is possible to increase the engine rotational speed Ne more quickly than to increase the engine rotational speed Ne with the target transmission ratio Ip (1).

Then, when the engine rotational speed Ne increases and it is determined to be greater than or equal to the first upshift determination rotational speed Nup1 in Step S124 (timing C, point C), the upshift amount is set in Step S127, and a shift control based on this upshift amount is performed. The target engine rotational speed tNe at this time is set to a value that takes into account the increment of the traveling resistance more than the first target engine rotational speed tNe (timing B) when transitioning to the pseudo-stepped upshift mode Mstp. When an upshift is executed, the initial determination flag F2nd is set to 1.

When an upshift is executed, the engine rotational speed Ne is reduced by the third engine rotational speed change amount ΔNe3 (timing D, point D). Then, since the initial determination flag F2nd is set to 1, the process proceeds from Step S116 to Step S119, and the target transmission ratio change amount ΔIp=0 is set. As a result, after the first upshift has ended, a linear shift is executed along the transmission ratio target transmission ratio Ip (2) at point D at the time of the end of the upshift, as illustrated in FIG. 6.

Thereafter, when the target engine rotational speed tNe increases again and the engine rotational speed Ne reaches the first upshift determination rotational speed Nup1 (timing E, point E), an upshift is again performed in Step S127 (timing F, point F). Thereafter, step-by-step upshift is performed as illustrated by the movement from (timing G, point G) to (timing H, point H). By executing this step-by-step upshift, the target engine rotational speed tNe is temporarily reduced, but the actual engine rotational speed Ne increases together with an increase in the vehicle speed VSP thereafter, and G is also graphed rising correspondingly upward.

In this manner, the sense of acceleration is improved by the engine rotational speed Ne rising in conjunction with the rise in the vehicle speed VSP, and G also rising accordingly. In the pseudo-stepped upshift mode, by the step-by-step upshift being performed after the Low shift and the linear shift, a state in which the engine rotational speed Ne rises in conjunction with the rise in the vehicle speed VSP is continuously performed, thereby making it possible to improve the sense of acceleration.

Figure 7:
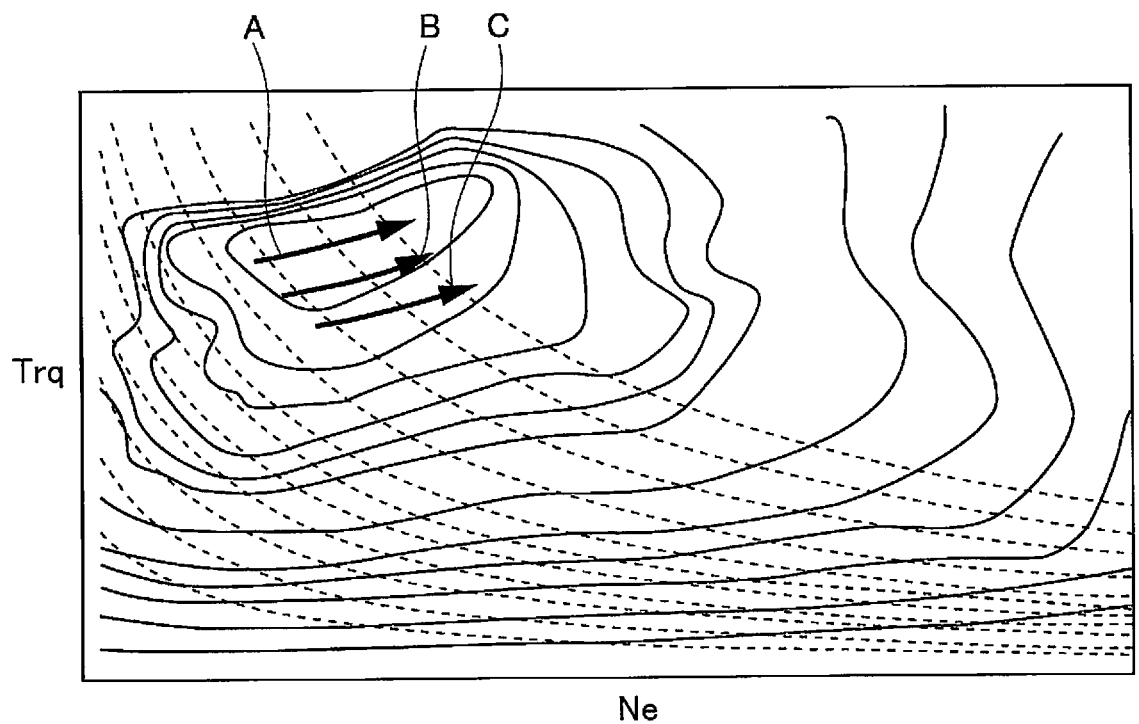
FIG. 7 is an explanatory view illustrating the relationship between the engine rotational speed, the engine torque, the fuel consumption rate, and the output horsepower in the transmission ratio control of the first embodiment.

FIG. 7 is an explanatory view illustrating the relationship between the engine rotational speed, the engine torque, the fuel consumption rate, and the output horsepower in the transmission ratio control of the first embodiment. In the view illustrated in FIG. 7, the equal fuel consumption rate is illustrated by the solid contour lines corresponding to the engine rotational speed Ne and the engine torque Trq, and the central portion of the contour-like lines represents the most fuel-efficient operating state. In addition, the equal horsepower lines of the engine 11 are illustrated by dotted lines corresponding to the engine rotational speed Ne and the engine torque Trq. In Steps S124 and S127 in FIG. 2, a control is performed so that the engine rotational speed Ne decreases by performing an upshift when the engine rotational speed Ne exceeds the first upshift determination rotational speed Nup1. Through control in this manner, a rise in the engine rotational speed Ne is suppressed, an appropriate engine output corresponding to the accelerator pedal opening amount APO can be achieved, and it becomes possible to continue operation in the vicinity of the optimum fuel economy state.

More specifically, after the initial acceleration after transitioning to the pseudo-stepped upshift mode Mstp, the path indicated by line A in FIG. 7 is followed. Thereafter, if an upshift is performed, the engine rotational speed Ne decreases, and the path becomes similar to that of line B in FIG. 7. If an upshift is again performed, the path becomes similar to that of line C in FIG. 7. In this manner, since the engine rotational speed Ne is not unnecessarily increased by a step-by-step upshifting, it is possible to use a region in which the engine torque Trq and the fuel consumption rate are both continuously efficient.

Figure 8:
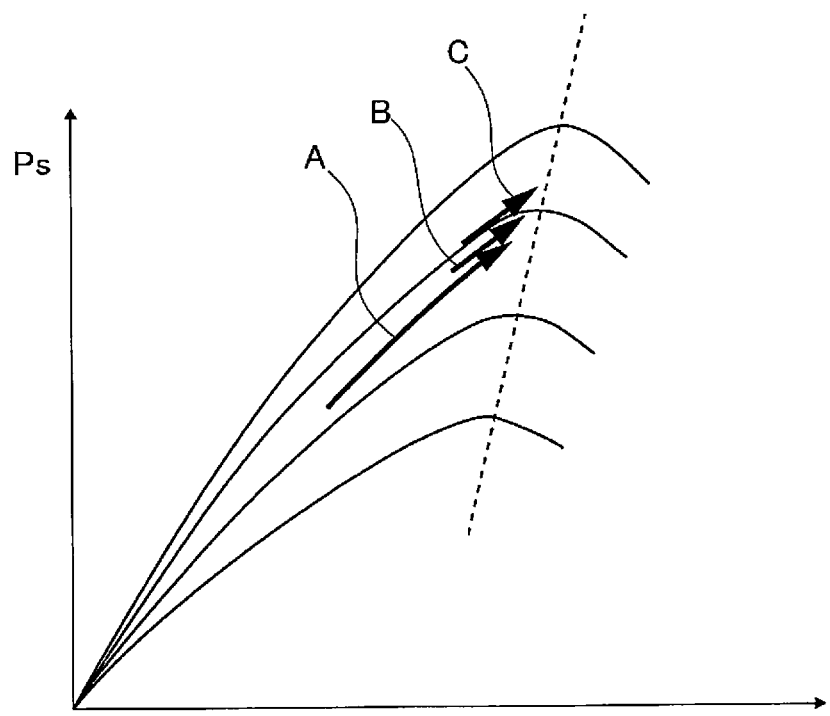
FIG. 8 is an explanatory view illustrating the relationship between the engine rotational speed and the output horsepower in the transmission ratio control of the first embodiment.

FIG. 8 is an explanatory view illustrating the relationship between the engine rotational speed and the output horsepower in the transmission ratio control of the first embodiment. As illustrated by the solid lines in FIG. 8, the output horsepower of the engine 11 has a characteristic line corresponding to the engine rotational speed Ne for each opening amount of the throttle valve. The throttle valve opening amount and the accelerator pedal opening amount APO have a similar relationship. Normally, the peak of the engine output horsepower Ps is in the vicinity of a predetermined engine rotational speed Ne (illustrated by the dotted line in the drawing). For example, the peak of the engine output horsepower Ps is when the engine rotational speed Ne is in the vicinity of 4000-6000 [rpm]. The efficiency of the power performance of the engine 11 becomes highest by bringing the operating state of the engine 11 close to the peak of the engine output horsepower Ps. In addition, in the first embodiment, control is performed so that the engine rotational speed Ne decreases by performing an upshift when the engine rotational speed Ne exceeds an upshift determination rotational speed Nup determined for each accelerator pedal opening amount APO. A rise in the engine rotational speed Ne is thereby suppressed, and it becomes possible to continue operation in a region in which the efficiency of the power performance of the engine 11 is high.

More specifically, after the initial acceleration after transitioning to the pseudo-stepped upshift mode Mstp, the path indicated by line A in FIG. 8 is followed. Thereafter, if an upshift is performed, the engine rotational speed Ne decreases, and the path becomes similar to that of line B in FIG. 8. If an upshift is performed again, the path becomes similar to that of line C in FIG. 8. Since an increase in the engine rotational speed Ne is suppressed in this manner, it is possible to maintain a state in which the output horsepower of the engine 11 is high and to use a region in which the power performance of the engine 11 is continuously efficient.

As described above, in the first embodiment, when there is an acceleration request, the mode is shifted to the pseudo-stepped upshift mode, and, after first performing an initial acceleration by downshifting in linear shift, control to suppress change in the transmission ratio is executed in order to thereby reduce noise and discomfort imparted to the driver caused by an increase in the engine rotational speed.

Then, when the engine rotational speed Ne exceeds the first upshift determination rotational speed Nup1 set in Step S115, by upshifting, it is possible to improve the sense of acceleration by the engine rotational speed Ne, which has temporarily decreased, again increasing together with the increase in the vehicle speed VSP. In addition, since this upshift is repeatedly performed (step-by-step upshift), it is always possible to suppress an excessive increase in the engine rotational speed Ne, and the fuel consumption can be improved by using a region in which the engine efficiency is high even during acceleration. Additionally, since an upshift is performed at a lower engine rotational speed Ne as the driver's acceleration request becomes smaller, the engine rotational speed Ne is not increased even when the acceleration request is small, and it is possible to prevent a deterioration in fuel efficiency.

Action of Shift Control in NG Region

Figure 11:
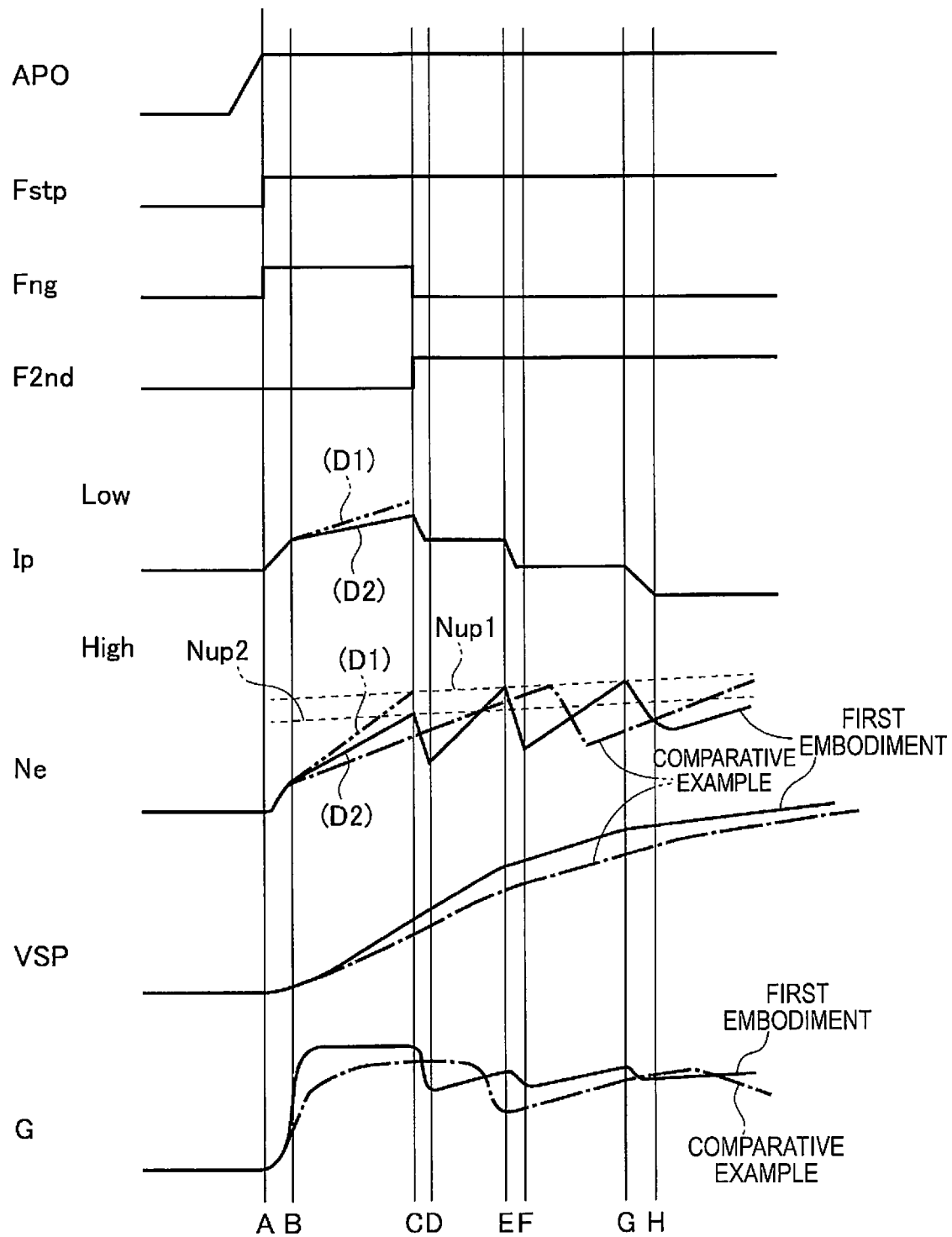
FIG. 11 is a timing chart illustrating the shift control in the NG region of the first embodiment.
Figure 12:
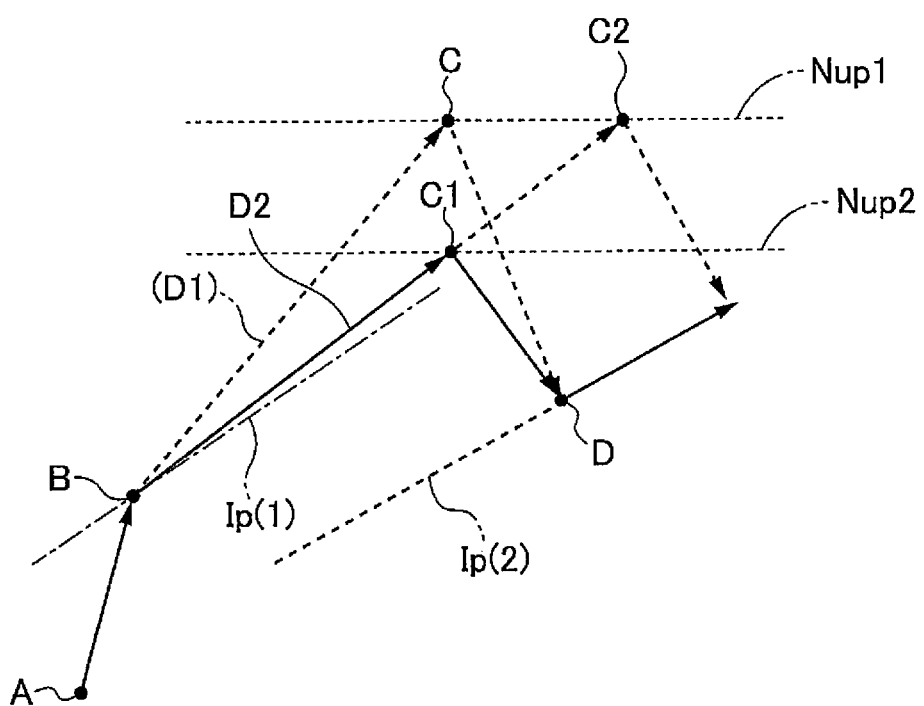
FIG. 12 is an enlarged view showing the movement of an operating point in a plane defined by the vehicle speed and the engine rotational speed according to a shift control in the NG region of the first embodiment.

FIG. 11 is a timing chart illustrating the shift control in the NG region of the first embodiment. This timing chart illustrates, from the top of FIG. 11 the state of each of the accelerator pedal opening amount APO, pseudo-stepped upshift mode flag Fstp, in-NG region flag Fng, initial determination flag F2nd, target transmission ratio Ip, engine rotational speed Ne, vehicle speed VSP, and G, on a time axis oriented from left to right. In addition, FIG. 12 is an enlarged view showing the movement of an operating point in a plane defined by the vehicle speed and the engine rotational speed according to a shift control in the NG region of the first embodiment. The timings A, B, C, D in FIG. 11 correspond to points A, B, C, D in FIG. 12, and the arrows that connect each of the points in FIG. 12 represent the manner in which the operating point moves over time. FIGS. 11, 12 illustrate a case in which the operating point is determined to be inside an NG region at timing A.

Since the basic operation is the same as when within an NG region, only the differing points will be described. Since the in-NG region flag Fng is set to 1 after the initial acceleration, a second transmission ratio change amount D2, which is smaller than the first transmission ratio change amount D1 that is set when within an NG region in Step S117, is set as the target transmission ratio change amount ΔIp, and a shift control is started according to target transmission ratio change amount ΔIp=second transmission ratio change amount D2 by Low shift (timing B, point B). At this time, when the transmission ratio at point B after initial acceleration is considered as the target transmission ratio Ip (1), a shift control toward a region on a lower transmission ratio side than the target transmission ratio Ip (1), and that is on a higher transmission ratio side than target transmission ratio change amount ΔIp=first transmission ratio change amount D1, is performed by suppressed Low shift, as illustrated in FIG. 12. At this time, even if acceleration were to be started according to target transmission ratio change amount ΔIp=first transmission ratio change amount D1 in an NG region (refer to the two-dot chain line in FIG. 11), the engine rotational speed Ne cannot be effectively increased due to limitations by the characteristics of the engine 11 or limitations by the characteristics of the continuously variable transmission 10. Similarly, even when Low shift is not performed while maintaining the target transmission ratio Ip (1), the engine rotational speed Ne still cannot be effectively increased. Therefore, an increase in the engine rotational speed Ne actually tends to be delayed, as shown by the comparative example indicated by the one-dot chain line in FIG. 11.

Therefore, by performing a suppressed Low shift at a second transmission ratio change amount D2 that is smaller than target transmission ratio change amount ΔIp=first transmission ratio change amount D1 as in the first embodiment, it is possible to increase the engine rotational speed Ne more quickly than when increasing the engine rotational speed Ne at target transmission ratio change amount ΔIp=first transmission ratio change amount D1, or at the target transmission ratio Ip (1). However, if the upshift determination rotational speed Nup is set to the same first upshift determination rotational speed Nup1 as in the normal Low shift, the timing of the upshift will be delayed by the amount of decrease in the increase gradient of the engine rotational speed Ne (refer to point C2 in FIG. 12). Therefore, during a suppressed Low shift, a second upshift determination rotational speed Nup2 that is lower than the first upshift determination rotational speed Nup1 is set, and it is thereby possible to start an upshift at a similar timing as in the normal Low shift (refer to point C1 in FIG. 12).

Next, when the engine rotational speed Ne increases and is determined to be greater than or equal to the second upshift determination rotational speed Nup2 in Step S124 (timing C, point C1), the upshift amount is set in Step S127 and a shift control based on this upshift amount is performed. The target engine rotational speed tNe at this time is set to a value that takes into account the incrementing of the traveling resistance more than the first target engine rotational speed tNe (timing B) when transitioning to the pseudo-stepped upshift mode Mstp. When an upshift is executed, the initial determination flag F2nd is set to 1.

When an upshift is executed, the engine rotational speed Ne is reduced by the third engine rotational speed change amount $\Delta Ne3$ (timing D, point D). Then, since the initial determination flag F2nd is set to 1, the process proceeds from Step S116 to Step S119, and target transmission ratio change amount $\Delta Ip=0$ is set. As a result, after the first upshift has ended, a linear shift is executed along the transmission ratio target transmission ratio Ip (2) at point D at the time of the end of the upshift, as illustrated in FIG. 12.

Thereafter, when the target engine rotational speed tNe again increases and the engine rotational speed Ne reaches the first upshift determination rotational speed Nup1 (timing E), an upshift is again performed in Step S127 (timing F). Thereafter, step-by-step upshifting is performed. By executing this step-by-step upshifting, the target engine rotational speed tNe is temporarily reduced, but the actual engine rotational speed Ne increases together with an increase in the vehicle speed VSP thereafter, and G is also graphed rising correspondingly upward.

In this manner, the sense of acceleration is improved by the engine rotational speed Ne rising in conjunction with the rise in the vehicle speed VSP, and G also rising accordingly. In the pseudo-stepped upshift mode Mstp, by performing the step-by-step upshift after the suppressed Low shift and the linear shift, a state in which the engine rotational speed Ne rises in conjunction with the rise in the vehicle speed VSP is continuously performed, thereby making it possible to improve the sense of acceleration.

As described above, the effects listed below can be obtained in the first embodiment.

(1) From among a normal shifting mode Mnor (first control mode) in which a transmission ratio of a continuously variable transmission 10, which shifts and outputs engine rotational speed Ne in a stepless manner, is variably controlled in a stepless manner, and a pseudo-stepped upshift mode Mstp (second control mode) in which the transmission ratio is controlled such than the engine rotational speed Ne increases in conjunction with an increase in a vehicle speed to perform an upshift after the vehicle has accelerated, one control mode is selected in accordance with an acceleration request by a driver, and when controlling the transmission ratio based on the selected control mode, downshifting is continued until an upshift occurs if the pseudo-stepped upshift mode Mstp is selected.

Therefore, even when the engine torque Trq or the engine output horsepower Ps at the engine rotational speed Ne when the accelerator pedal is depressed is low and it is difficult to accelerate, the engine rotational speed Ne can be effectively increased by continuously downshifting, and it becomes possible to accelerate by ensuring the engine torque Trq and the engine output horsepower Ps.

(2) The pseudo-stepped upshift mode Mstp is selected when at least one of an accelerator pedal opening amount APO and an accelerator pedal opening speed dAPO is a predetermined value or higher. Therefore, a shift control corresponding to the driver's acceleration intent can be achieved.

(3) When continuously downshifting until an upshift occurs in the pseudo-stepped upshift mode Mstp, a downshift is performed until increasing to an engine rotational speed Ne at which an engine torque and an engine output horsepower are high.

Therefore, even if the engine rotational speed Ne at the start of acceleration is low and the engine torque Trq and the engine output horsepower Ps are low, it is possible to secure the engine torque Trq and the engine output horsepower Ps by quickly increasing the engine rotational speed Ne.

(4) When continuously downshifting until an upshift occurs in the pseudo-stepped upshift mode Mstp, a downshift is performed such that a target transmission ratio change amount $\Delta Ip$ becomes constant. Therefore, it is possible to realize a stable transmission ratio control.

(5) When it is determined that the traveling state at the start of acceleration is within an NG region (the state in which there is the risk that the predetermined shift speed cannot be achieved), the downshift amount is reduced relative to when a predetermined shift speed can be achieved. Specifically, the target transmission ratio change amount $\Delta Ip$ is set to a second transmission ratio change amount D2 rather than the first transmission ratio change amount D1. Specifically, the target transmission ratio change amount $\Delta Ip$ is set to the second transmission ratio change amount D2 when the engine rotational speed Ne cannot be effectively increased or when a shift speed cannot be secured.

Therefore it is possible to suppress a rise in the engine rotational speed Ne while securing the driving force.

(6) The pseudo-stepped upshift mode Mstp is a mode in which an upshift is performed when reaching an upshift determination rotational speed Nup (predetermined engine rotational speed), and when the target transmission ratio change amount $\Delta Ip$=second transmission ratio change amount D2 (when the downshift amount is reduced), the upshift determination rotational speed Nup is set to a second upshift determination rotational speed Nup2, which is lower than a first upshift determination rotational speed Nup1 (the predetermined engine rotational speed is reduced).

Therefore, it is possible to essentially match the timing at which the engine rotational speed Ne reaches the second upshift determination rotational speed Nup2 to the timing at which the engine rotational speed Ne reaches the first upshift determination rotational speed Nup1 in the normal Low shift, and to perform an upshift with the same rhythmic sense as in the normal Low shift, even in the suppressed Low shift.

Another Embodiment

Next, another embodiment will be described. In the first embodiment, the target transmission ratio change amount $\Delta Ip$ was set to a first transmission ratio change amount D1 or a second transmission ratio change amount D2, which are fixed values, after the initial acceleration. In contrast, in this embodiment, the value gradually increases with time, as indicated by D3 in FIG. 5. Here, if the trajectory of the operating point is expressed in a plane defined by the vehicle speed and the engine rotational speed as in FIG. 6, the slope of the line connecting the operating point and the origin is expressed as the transmission ratio. At this time, the tangent line of the trajectory of the operating point in the section corresponding to point B to point C in FIG. 6 will not pass through the origin of FIG. 6. In this case, the engine rotational speed Ne is slowly raised during the initial period when there is insufficient engine torque Trq and engine output horsepower Ps, and the engine rotational speed Ne is quickly raised during the latter period when the engine torque Trq and the engine output horsepower Ps begin to be secured; therefore, the engine rotational speed Ne can be effectively increased.

As described above, in this embodiment, in addition to the action and effects of (1)-(3), (5), and (6) of the first embodiment, the following action and effects can be realized.

(7) When continuously downshifting until an upshift occurs in the pseudo-stepped upshift mode Mstp, a downshift is performed such that a transmission ratio change amount is gradually increased. Therefore, the engine rotational speed Ne can be effectively increased.

In addition, in the first embodiment, the target transmission ratio change amount ΔIp was set to a fixed value that is set in advance, but a map or a calculation formula may be provided in which the initial value of the first transmission ratio change amount D1, the second transmission ratio change amount D2, or D3 becomes larger as the accelerator pedal opening amount APO and the accelerator pedal opening speed threshold dAPO2 are increased. As a result, it is possible to secure the driving force by effectively increasing the engine rotational speed Ne by correspondence of the Low shift to the acceleration intent.

The invention claimed is:

1. A control method for controlling an automatic transmission having a first control mode in which a transmission ratio of a continuously variable transmission is controlled in a stepless manner, and a second control mode in which the transmission ratio is controlled in a stepwise manner to perform an upshift after a vehicle speed has increased, the control method comprising:
   continuously downshifting until the upshift is performed when the second control mode is selected in response to a driver's acceleration request,
   the continuous downshifting being executed during a period from when the driver's acceleration request occurs until an engine rotational speed reaches an upshift determination rotational speed.

2. The automatic transmission control method as recited in claim 1, wherein
   the second control mode is selected when at least one of an accelerator pedal opening amount and an accelerator pedal opening speed is a predetermined value or higher.

3. The automatic transmission control method as recited in claim 1, wherein
   when the continuously downshifting is performed until the upshift occurs while in the second control mode, the downshifting is performed until an engine rotational speed increases to an amount at which an engine torque and an engine output horsepower are sufficient for acceleration.

4. The automatic transmission control method as recited in claim 1, wherein
   when the continuously downshifting is performed until the upshift occurs while in the second control mode, the downshifting is performed such that a transmission ratio change amount becomes constant.

5. The automatic transmission control method as recited in claim 1, wherein
   when the continuously downshifting is performed until the upshift occurs while in the second control mode, the downshifting is performed such that a transmission ratio change amount increases with time.

6. A control method for controlling an automatic transmission having a first control mode in which a transmission ratio of a continuously variable transmission is controlled in a stepless manner, and a second control mode in which the transmission ratio is controlled in a stepwise manner to perform an upshift after a vehicle speed has increased, the control method comprising:
   continuously downshifting until the upshift is performed when the second control mode is selected in response to a driver's acceleration request; and
   reducing a downshift amount upon determining that a traveling state at a start of acceleration is a state in which a risk exists that a predetermined shift speed cannot be achieved as compared to when the predetermined shift speed can be achieved.

7. The automatic transmission control method as recited in claim 6, wherein
   the second control mode is a mode in which the upshift is performed when reaching a predetermined engine rotational speed, and
   when the downshift amount is reduced, the predetermined engine rotational speed is reduced.

8. An automatic transmission comprising:
   a continuously variable transmission, and
   a controller that selects one control mode from among a first control mode in which a transmission ratio of the continuously variable transmission is controlled in a stepless manner, and a second control mode in which the transmission ratio of the continuously variable transmission is controlled in a stepwise manner to perform an upshift after the vehicle speed has increased, in accordance with a driver's acceleration request, and that controls the transmission ratio of the continuously variable transmission based on the control mode that was selected, and
   when selecting the second control mode, the controller continuously downshifts until the upshift is performed,
   the controller executing the continuous downshifting during a period from when the driver's acceleration request occurs until an engine rotational speed reaches an upshift determination rotational speed.

* * * * *